United States Patent [19]
Tobey et al.

[11] 3,774,749
[45] Nov. 27, 1973

[54] CONVEYING APPARATUS FOR OBLONG PRODUCTS

[75] Inventors: Hubert E. Tobey; George O. Moller, both of Dumont; Richard L. Twiford, Teaneck, all of N.J.

[73] Assignee: International Telephone and Telegraph Corporation, Nutley, N.J.

[22] Filed: Aug. 11, 1972

[21] Appl. No.: 280,027

Related U.S. Application Data
[62] Division of Ser. No. 105,446, Jan. 11, 1971, Pat. No. 3,695,411.

[52] U.S. Cl. ............................. 198/33 AB, 198/167
[51] Int. Cl. ....................... B65g 47/24, B65g 15/00
[58] Field of Search .................... 198/33 AB, 33 AC

[56] References Cited
UNITED STATES PATENTS
1,616,101  2/1927  Ackley ........................ 198/33 AB
2,947,406  8/1960  Hazelton ...................... 198/33 AC
3,061,071  10/1962  Roehrbein ..................... 198/33 AC FOREIGN PATENTS OR APPLICATIONS
1,060,767  7/1959  Germany ....................... 198/33 AB

*Primary Examiner*—Richard E. Aegerter
*Attorney*—Charles L. Johnson, Jr.

[57] ABSTRACT

Conveying apparatus for receiving oblong products positioned with their axis in a direction perpendicular to the conveying direction and for turning the products so that their long axis is in line with the conveying direction. The apparatus includes a pair of parallel and unequal speed belts cooperating to cause initial turning of the oblong product, and with the aid of a turning roller and angled belt opposite the roller, the complete turn-around of the product so that it moves with its long axis in the conveying direction.

4 Claims, 5 Drawing Figures

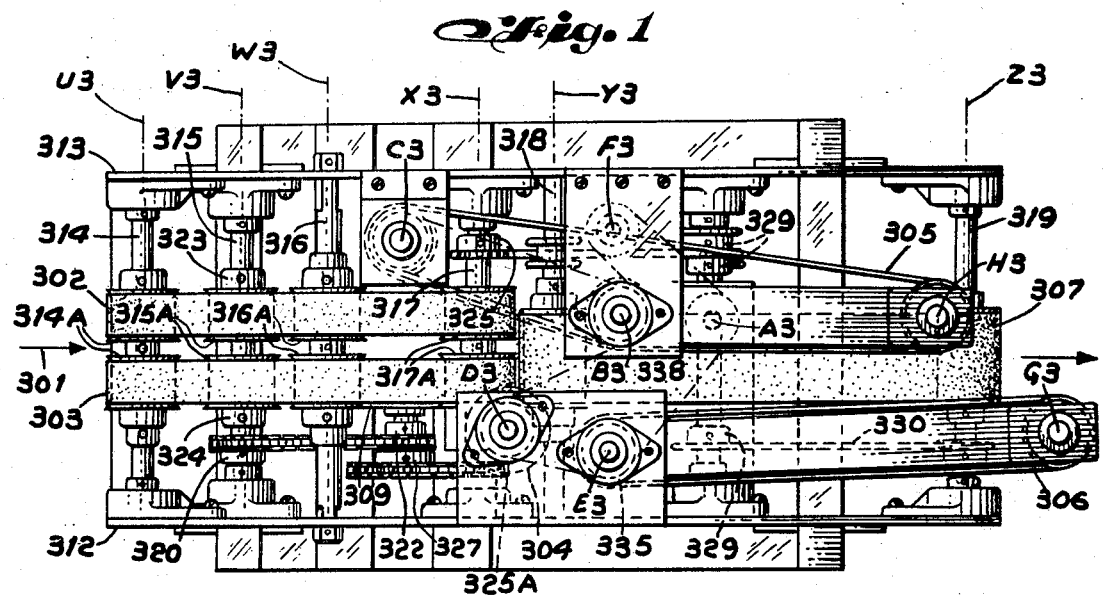
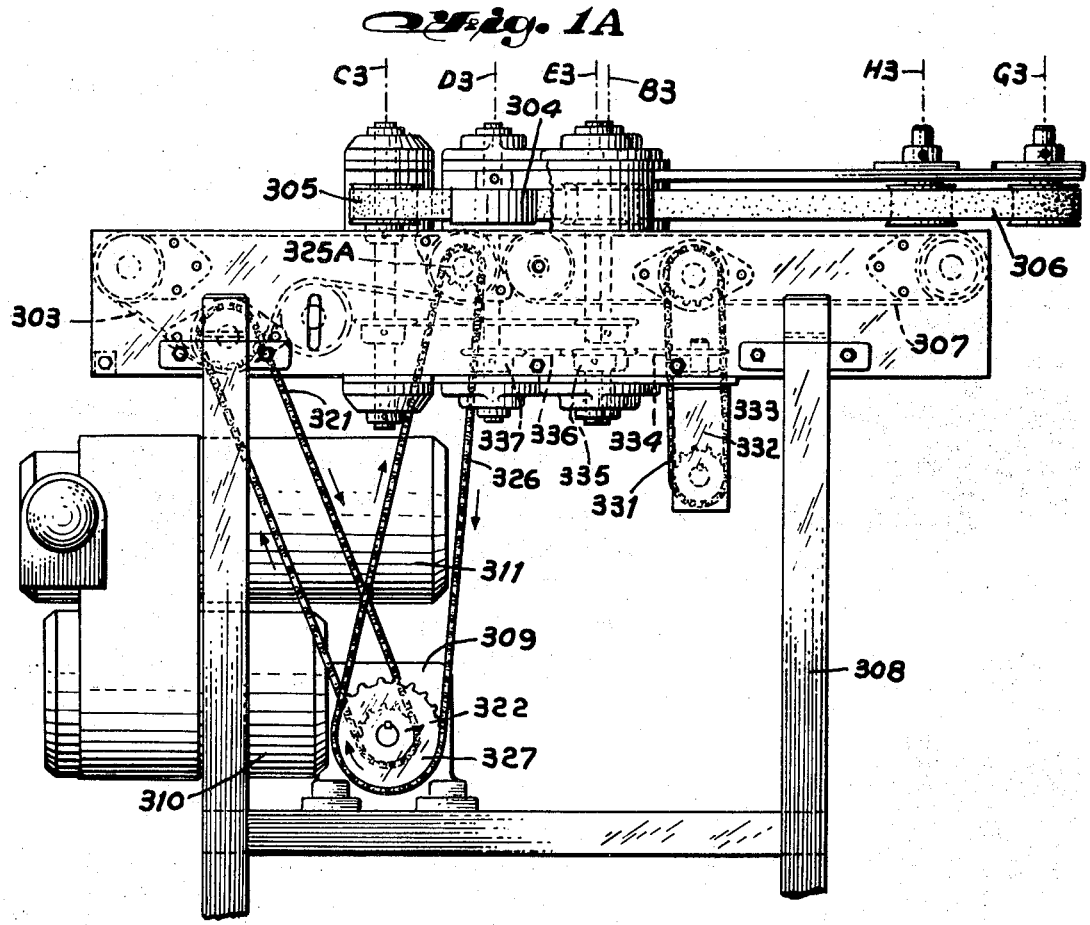

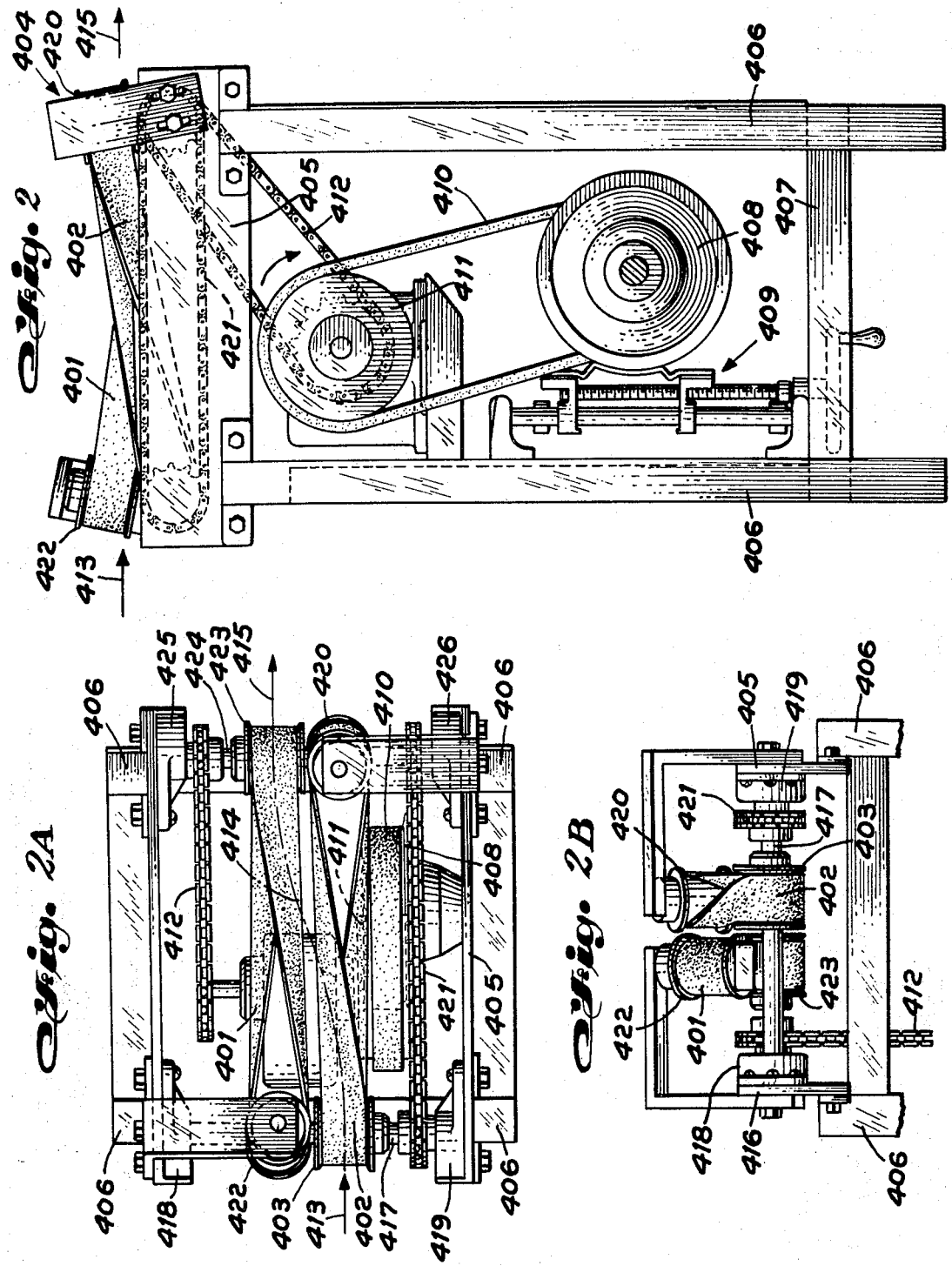

CONVEYING APPARATUS FOR OBLONG PRODUCTS

This is a division, of application Ser. No. 105,446, filed Jan. 11, 1971, and now U.S. Pat. No. 3695411.

SUMMARY OF THE INVENTION

An object of the present invention is to provide conveying apparatus for receiving oblong products positioned with their axis in a direction perpendicular to the conveying direction and turning the products so that their long axis is in line with the conveying direction.

Another feature of the invention is to provide conveying apparatus for receiving oblong products positioned with their axis in a direction perpendicular to the conveying direction and turning the products so that their long axis is in line with the conveying direction.

BRIEF DESCRIPTION OF THE DRAWINGS

The invention will best be understood if the specification is read in connection with the accompanying drawings, in which:

FIGS. 1 and 1A illustrate the conveying apparatus for oblong products according to the invention; and FIGS. 2, 2A and 2B illustrate the turn-over conveyor according to the invention.

The conveying apparatus for oblong products according to the invention is illustrated in FIGS. 1 and 1A. FIG. 1 is a plan view of the apparatus in which the products move perpendicular to the direction indicated by flow arrow 301. The products are turned by two driven parallel belts 302 and 303 which have different speeds, a turn-around roller 304, and cooperating side belts 305 and 306. The products are moved out of the apparatus in a single line by belt 307 to the turnover conveyor. The following structural details are connected to control and drive the belts and roller to accomplish the turning action.

In FIG. 1A, the frame 308 mounts a gear reduction 309 and motor means 310 and 311. The side frame members 312 and 313 mount shaft members 314, 315, 316, 317, 318 and 319 on axes indicated respectively as U3, V3, W3, X3, Y3 and Z3. Turn-around wheel 304 is mounted on axis D3 and the side belts 305 and 306 are respectively mounted about axes C3, B3, H3 and E3, G3. The drive for parallel belts 302 and 303 is by sprocket wheel 320 which is coupled via link 321 to output pulley 322 of gear box 309. The two speeds of parallel belts 302 and 303 are accomplished via different diameter gear pulley members 323 and 324, the inside surface of the belt being ribbed to mesh with the members 323, 324. The belt rotates about the rotatable pulley mountings 314A, 316A and 317A which are fixed to the respective shafts 314, 316 and 317. Shafts 314, 315, 317 are rotatably mounted and shafts 316, 318 are fixed to the side members 312 and 313. Sprocket wheel 325a is coupled via chain link 326 to the output pulley 327 of gear box 309. The sprocket 325 is coupled via chain link 328 to a three coupling pulley 329. The three coupling pulley 329 is coupled via link 330 to shaft 319 on axis Z3, and via link 331 to right angle drive means 332. Right angle drive means 332 connects sprocket wheel 333 via link 334 to sprocket wheel 335 to provide rotation of belt 306 about axes E3, G3. Sprocket wheel 335 is further connected via link 336 to sprocket wheel 337 to provide rotation of roller 304 about axis D3. As illustrated in dashed lines in FIG. 1, the chain link 338 is mounted about axial pulleys A3, F3, B3 and around D3 and E3 which supply the rotating power to the belt 305. The apparatus illustrated has the proper gear ratio so that belt 302 moves at 105 linear feet per minute and belt 303 moves at 90 linear feet per minute. This speed together with the tacky texture of the fresh baked cake product causes one end of its elongated shape to lead the other end and with the aid of turning wheel 304 and slant portion of belt 305 both completes the turning and individual lining of the parallel cake products so that they move between parallel sides of belts 305 and 306 and onto belt 307. Wheel 304 moves at 380 linear feet per minute and belts 305, 306, 307 travel at the same speed of 220 linear feet per minute. Therefore, the two parallel unequal speed belts 302 and 303 cooperate initially to cause the angular turning of the oblong cake product and with the aid of the turning roller 304 and the angular sloped portion of belt 305 opposite roller 304 causes the complete turn-in of the product so that it moves on belt 307 past the axial section line Y3. The products are in a single file and conveyed to turn-over conveyor 108.

Referring now to FIGS. 2, 2A and 2B, a turn-over conveyor according to the invention is illustrated. FIG. 2 illustrates a pair of turn-over belts 401 and 402 which are pulley mounted by means 403 and 404. The turn-over belts are mounted in side frame 405 which is supported by structure means 406 and 407. A motor 408 is mounted by means 409 to the structural members 406 and 407 and is coupled by drive belt 410 to gear reduction means 411. The gear reduction member 411 is coupled via link means 412 to drive one of the belts, the other belt is driven by a similar link to 412 which is not shown for simplicity.

FIG. 2A illustrates a top plan view of the conveyor and FIG. 2B illustrates a partial end view of the turn-over conveyor according to FIG. 2. The products flow in direction of arrow 413 in single file on belt 402 following dashed line 414 and are turned on the side by the cooperation of the half twist belts 402 and 401, the product then exiting on belt 401 in the direction of flow arrow 415. Belts 401 and 402 are half twisted about the pulley mounts 403, 420, 422, 423 which are rotatably mounted on the side frame members 405 and 416. Pulley mount 403 is rotatably mounted on shaft 417 through bearing mounts 418 and 419 to the frame side walls. The belt 412 imparts the motion of the gear reducer to the pulley belt arrangements 402, 403 and 420. Belt 421 drives the belt 401 on pulley mountings 422 and 423. Pulley 423 of belt 401 is mounted by shaft 424 to bearing mounts 425, 426 to side walls.

Although I have described my invention in connection with specific apparatus, it should be clearly understood that this description is made only by way of example and is not to be considered a limitation on the scope of the invention as set forth in the objects and features thereof and in the accompanying claims.

We claim:

1. Conveying apparatus for receiving oblong products positioned with their axis in a direction perpendicular to the conveying direction and turning the products so that their long axis is in line with the conveying direction, the apparatus including:

a pair of endless belts positioned to receive said products, said belts are rotatably mounted in parallel between frame means and driven at different speeds;

a turn-around wheel rotatably mounted about an axis perpendicular to belt mounting axis, said wheel positioned laterally at the discharge end of one said pair of belts and cooperating with said belts to cause turning of said oblong products;

a cooperating side belt mounted on an axis perpendicular to the belt mounting axis, and having an angled portion posted laterally at the discharged end of the other of said pair of belts and opposite said turn-around wheel, whereby said side belt and wheel cooperate with said belts to cause the turning of said oblong products; and further belt means positioned subsequent to said pair of belts and wheel to convey the turned-around product through the apparatus.

2. The apparatus according to claim 1 wherein said oblong products are soft cake products, whereby the tacky texture of the soft cake products cause one end of the elongated shape to lead the other end while being conveyed on the different speed belts.

3. The apparatus according to claim 1 wherein said further belt means includes:

a first endless belt rotatably mounted in said frame means adjacent and subsequent to said wheel, and said cooperating side belt having a straight portion extending from said angled portion and positioned opposite said first belt; and an endless output belt mounted in a contiguous plane to said pair of belts, said output belt positioned beneath said side belt and first belt and the margin thereof extending lateral of said first belt.

4. Conveying apparatus for receiving oblong soft cake products positioned with their axis in a direction perpendicular to the conveying direction and turning the products so that their long axis is in line with the conveying direction, the apparatus including:

a pair of endless belts positioned to receive said products, said belts are rotatably mounted in parallel between frame means and driven at different speeds, whereby the tacky texture of the soft cake products cause one end of the elongated shape to lead the other end while being conveyed on said belts;

turn-around roller means rotatably mounted about an axis perpendicular to belt mounting axis, said roller means positioned laterally at the discharge end of one said pair of belts and cooperating with said belts to cause turning of said cake products;

a cooperating side belt mounted on an axis perpendicular to the belt mounting axis, and having an angled portion posted laterally at the discharge end of the other of said pair of belts and opposite said turn-around wheel, whereby said side belt and wheel cooperate with said belts to cause the turning of said oblong products;

further belt means positioned subsequent to said pair of belts and including a first endless belt rotatably mounted in said frame means adjacent and subsequent to said wheel, and said cooperating side belt having a straight portion extending from said angled portion and positioned opposite said first belt; and an endless output belt mounted in a contiguous plane to said pair of belts, said output belt positioned beneath said side belt and first belt and the margin thereof extending lateral of said first belt, whereby the turned-around cake products are conveyed through the apparatus.

* * * * *